United States Patent [19] | [11] 4,138,725
Ikemoto et al. | [45] Feb. 6, 1979

[54] AUTOMATIC FUEL COMBUSTION CONTROL METHOD AND SYSTEM

[75] Inventors: Zenichi Ikemoto, Akashi; Masaru Nishimura, Kobe, both of Japan

[73] Assignee: Kawasaki Jukogyo Kabushiki Kaisha, Kobe, Japan

[21] Appl. No.: 819,612

[22] Filed: Jul. 26, 1977

[30] Foreign Application Priority Data

Jul. 30, 1976 [JP] Japan .................................. 51/91506

[51] Int. Cl.[2] .......................... G06F 15/20; F23N 5/00

[52] U.S. Cl. .................................... 364/502; 364/510; 431/76; 364/109

[58] Field of Search ............... 364/502, 108, 510, 442, 364/109; 431/18-20, 75, 76, 12; 137/3, 4, 6, 88, 94; 23/230 A, 253 A, 253 PC; 60/276, 272, 39.18 R, 39.18 C, 39.18 A, 39.27; 123/32 EE; 236/14, 15 R, 15 E

[56] References Cited

U.S. PATENT DOCUMENTS

| | | | |
|---|---|---|---|
| 3,745,768 | 7/1973 | Zechnall et al. | 60/276 |
| 3,895,611 | 7/1975 | Endo et al. | 60/276 X |
| 3,911,884 | 10/1975 | Moriya et al. | 60/276 X |
| 3,960,118 | 6/1976 | Konomi et al. | 60/276 X |

*Primary Examiner*—Joseph F. Ruggiero
*Attorney, Agent, or Firm*—Haseltine, Lake & Waters

[57] ABSTRACT

Combustion of fuels each containing at least one combustible component, wherein, while the composition of each combustible component is known, the mixture ratio of only one combustible component is yet unknown, is automatically controlled by: measuring the flow rate of each fuel, the flow rate of air for the combustion, and the percentage proportion of residual oxygen in the combustion exhaust gas; introducing the values thus measured as input into a combustible component ratio detector comprising an operational circuit according to a combustion reaction formula thereby to automatically determine the unknown combustible mixture ratio; multiplying this mixture ratio by a flow rate signal corresponding to the same fuel; and utilizing the resulting product value for automatic control of the flow rate of each fuel and the combustion air.

3 Claims, 6 Drawing Figures

AUTOMATIC FUEL COMBUSTION CONTROL METHOD AND SYSTEM

BACKGROUND OF THE INVENTION

This invention relates generally to combustion of fuels and more particularly to automatic systems for controlling the combustion of fuels. More specifically, the invention relates of an automatic fuel combustion control method and system by which, in an apparatus wherein a fuel which contains therein one or more kinds of combustible components, and in which, while the compositions of the one or more combustible components are known, the mixture ratio of only one of the combustible components is unknown, is undergoing combustion, the fuel is caused to undergo complete combustion as the control system automatically computes the appropriate air flow rate for the combustion.

In an ocean ship for transporting liquefied natural gas (referred to hereinafter by its abbreviation LNG), for example, natural gas which has vaporized is taken out of the LNG tanks and burned in a boiler in order to maintain the internal pressures in the LNG tanks within an allowable range. This natural gas contains methane constituting a combustible component and nitrogen constituting an incombustible component. Since the vaporization temperature of the nitrogen is lower than that of the methane, the quantity of the nitrogen is relatively large and the mixture ratio of the combustible methane is low in the gas thus taken out of the LNG tanks soon after the LNG tanks have been loaded with the LNG. However, with the elapse of time, the mixture ratio of the methane increases. The mixture ratio of the combustible component is generally unknown and is said to vary between 60 to 100 percent with time.

Furthermore, since the quantity of the natural gas taken out of the LNG tanks is determined in accordance with the object of maintaining the pressures in the LNG tanks within an allowable range, fuel oil is ordinarily burned simultaneously with the natural gas in order to maintain constant the steam pressure in the boiler as steam is generated at a flow rate demanded by the plant from the boiler. The feed rate of the natural gas, that of the fuel oil, or both feed rates are automatically controlled in accordance with the load (required steam generation rate) of the boiler.

Automatic control systems of known type have been accompanied by a number of problems as hereinafter described in detail.

SUMMARY OF THE INVENTION

It is an object of this invention to provide a method of and a system for automatically controlling combustion in which the above mentioned problems encountered in the automatic control systems of the prior art are overcome.

According to this invention in one aspect thereof, briefly summarized, there is provided, in the automatic combustion of fuels each containing at least one combustible component, wherein the composition of each combustible component is known, but the combustible component mixture ratio of one fuel is yet unknown, a method of automatically controlling the combustion of the fuels which comprises: measuring the flow rate of each fuel, the flow rate of air for the combustion, and the percentage ratio of residual oxygen in the exhaust gas resulting from the combustion; introducing the values thus measured as input into a combustible component ratio detector comprising an operational circuit of a reaction formula of the combustion thereby to automatically determine the combustible component mixture ratio of said one fuel of unknown combustible component mixture ratio; multiplying the combustible component mixture ratio thus determined by a signal of the flow rate of said one fuel; and utilizing the resulting value thus obtained by the multiplication for automatic control of the flow rates of said fuels and the flow rate of the air for the combustion.

According to this invention in another aspect thereof, briefly summarized, there is provided, in apparatus for automatic combustion of fuels each containing at least one combustible component, wherein the composition of each combustible component is known, but the combustible component mixture ratio of one fuel is yet unknown, an automatic combustion control system comprising: means for respectively measuring the flow rate of each fuel, the flow rate of air for the combustion, and the percentage ratio or residual oxygen in the exhaust gas resulting from the combustion and respectively generating signals respectively corresponding to results of the measurements; a combustible component ratio detector comprising an operational circuit of a reaction formula of the combustion, said detector being supplied with said signals and thus operating to automatically determining the combustible component mixture ratio of said one fuel of unknown combustible component mixture ratio; multiplication means for multiplying the combustible component mixture ratio thus determined by the signal of the flow rate of said one fuel; and controlling means operating in response to the value resulting from the multiplication to automatically control the flow rate of each fuel and the flow rate of the air for combustion.

The nature, utility, and further features of this invention will be more clearly apparent from the following detailed description when read in conjunction with the accompanying drawings, in which like parts are designated by like reference characters.

DETAILED DESCRIPTION

As conducive to a full understanding of the exact nature of this invention, general aspects of an automatic fuel combustion control system and various problems encountered in known systems of this character will first be considered.

Figure 1:
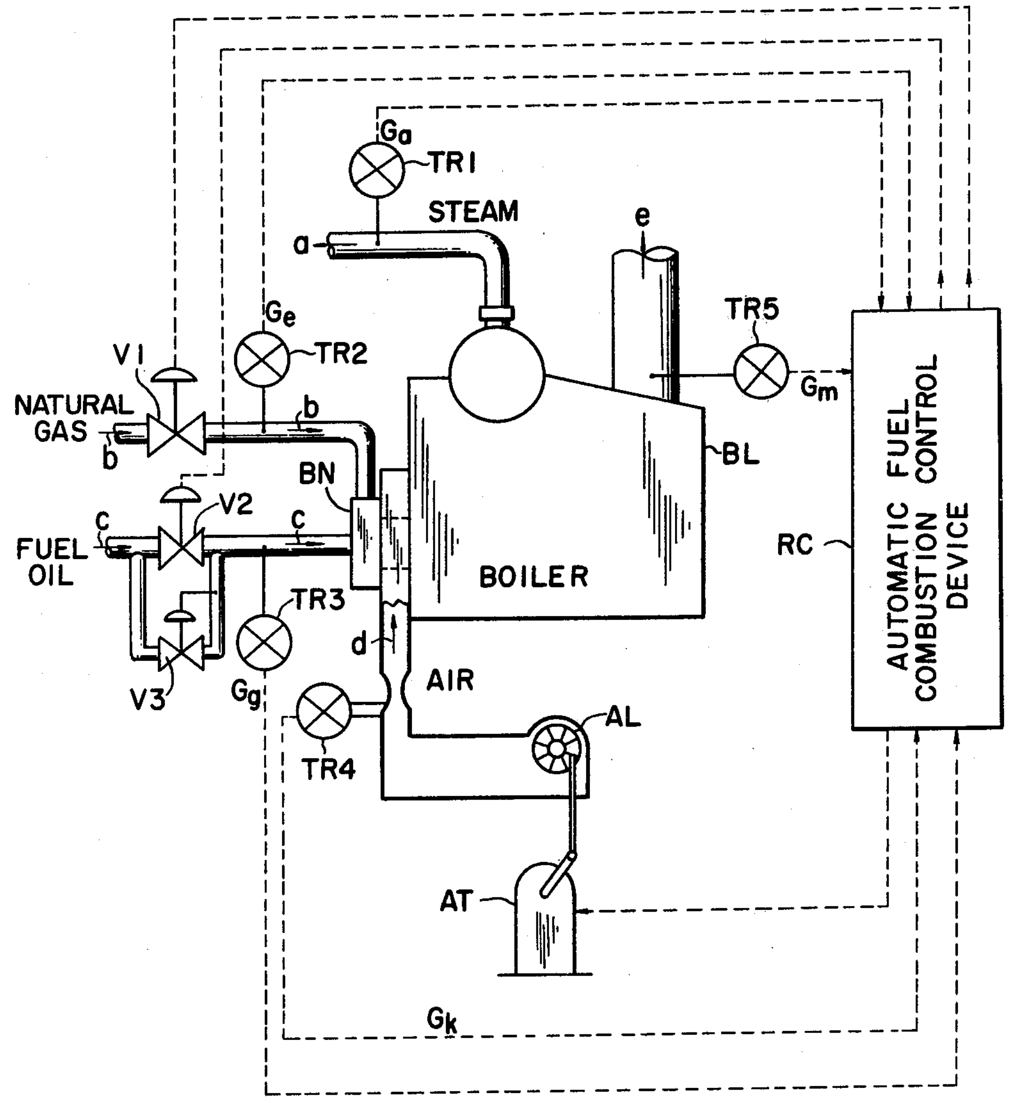
FIG. 1 PRIOR ART
FIG. 1 is a schematic diagram, partly in flow-chart form, showing an automatic fuel combustion control system of a boiler.
Figure 2:
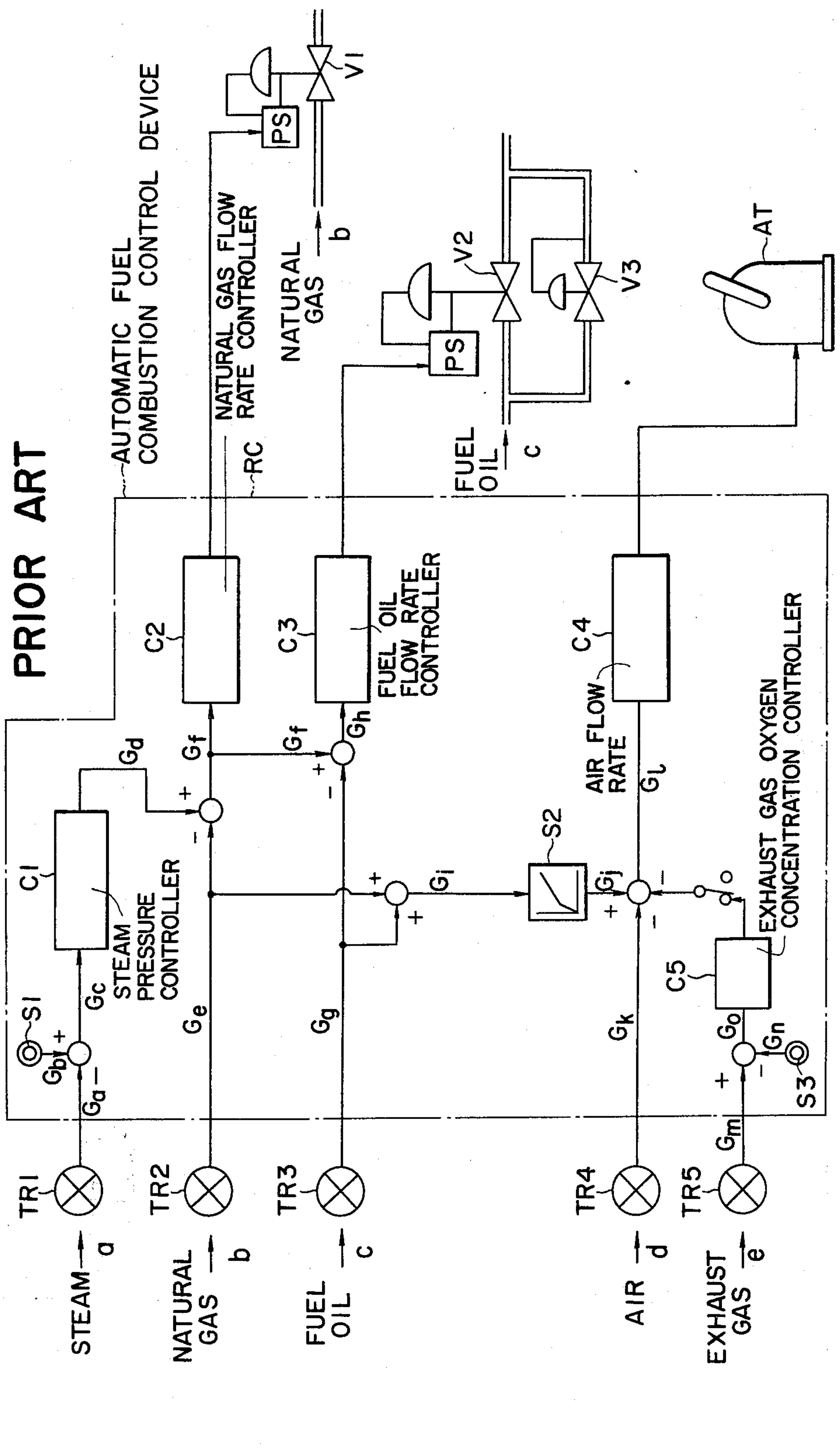
FIG. 2 PRIOR ART
FIG. 2 is a circuit diagram showing the essential organization of a known automatic fuel combustion control device.

Referring first to FIGS. 1 and 2, the aforementioned automatic control of the flow rate of natural gas, that of fuel oil, or both of a steam boiler in accordance with the boiler load will now be described in greater detail with respect to one example of a boiler BL.

As shown in FIG. 1, the boiler BL is provided with a mixed-gas burner BN in which a natural gas b and a fuel oil c are burned to heat water in the boiler BL into steam a. Air d for combustion is supplied into the burner BN to support combustion. As a result of combustion, boiler exhaust gas e is produced. The combustion in the burner BN is controlled by an automatic fuel combustion control device RC.

A steam pressure detector TRI is provided at the steam delivery outlet of the boiler BL to detect the pressure of the produced steam a at the outlet and generate a corresponding pressure signal Ga. This pressure signal Ga is fed to the automatic fuel combustion control device RC as shown in FIG. 2 and is there compared with a setting signal Gb produced by a steam pressure setter S1, and the resulting difference signal Gc is supplied to a steam pressure controller C1. In response to the difference signal Gc, the output signal Gd of the steam pressure controller C1 is so varied that the pressure of the steam a will become equal to the setting value. The output signal Gd of the steam pressure controller C1 constitutes a command signal determining the total or sum flow rate of the natural gas b and the fuel oil c to undergo combustion in the mixed-gas burner Bn and varies in response to the load of the boiler BL.

This sum fuel flow rate command signal Gd is compared with a natural gas flow rate signal Ge generated by a natural gas flow rate detector TR2 in response to the flow rate of the natural gas b supplied to the mixed-gas burner BN, and the resulting difference signal Gf is fed to a natural gas flow rate controller C2, which thereupon generates a corresponding control signal and sends this signal through a power circuit PS to a natural gas flow rate control valve V1 thereby to cause the natural gas flow rate signal Ge to become equal to the total fuel flow rate command signal Gd.

When only the natural gas b from an LNG tank (not shown) is sufficient as fuel for the combustion in the boiler BL, that is, in the case where the inlet pressure of the natural gas flow rate control valve V1 is high because the quantity of the natural gas supplied from the LNG tank is large, or in the case where, because the boiler load is small, the natural gas flow rate signal Ge can be caused to be equal to the total fuel flow rate command signal Gd by the control of the natural gas flow rate control valve V1, the input signal Gf of the natural flow rate controller C2, which signal Gf is the difference of the two signals Ge and Gd, in other words, the fuel oil flow rate command signal Gf, becomes zero, and, with a valve V2 for controlling the flow rate of the fuel oil c in fully closed state, the input pressure of the fuel oil burner is maintained at a minimum value determined by a minimum fuel oil pressure holding valve V3.

Conversely, in the case where the quantity of the natural gas b from the LNG tank is small, and the input pressure of the natural gas flow rate control valve V1 is low, or where the boiler load is large, and the natural gas flow rate signal Ge cannot be caused to be equal to the total fuel flow rate command signal Gd even with the control valve V1 in fully opened state, the fuel oil flow rate command signal Gf, which is the difference signal of the two signals Ge and Gd, is compared with a fuel oil flow rate signal Gg generated by a fuel oil flow rate detector TR3 in response to the flow rate of the fuel oil c fed to the burner BN. The resulting difference signal Gh is sent to a fuel oil flow rate controller C3, which thereupon sends a control signal to a power circuit PS thereby to control the fuel oil flow rate control valve V2 in a manner such that the deficit fuel is made up by the fuel oil c.

In an automatic fuel combustion control system of the character illustrated by the above described known example, the flow rate of the natural gas burned by the boiler is limited by the boiler load in the case where the boiler load is small even when the quantity of the natural gas b from the LNG tank is large. For this reason, the surplus natural gas is stored in the LNG tank when the pressure therein is within an allowable range, and, when this pressure reaches a predetermined upper limit, the gas is automatically discharged into the atmosphere.

In another example of a known fuel combustion control system, the flow rate of the natural gas b supplied from an LNG tank to be combusted in the boiler BL is controlled in accordance with only the purpose of holding the pressure in the LNG tank within an allowable range, and a natural gas flow rate controller C2 is not provided in the automatic combustion control device RC.

In a system of this character, however, in the case where the signal Ge from the natural gas flow rate detector TR2 is less than the total fuel flow rate command signal Gd from the steam pressure controller C1, the fuel oil flow rate control valve V2 is controlled in response to the fuel oil flow rate commmand signal Gf, which is the difference signal of these two signals Gd and Ge, thereby to control the steam pressure of the boiler at a constant value. Conversely, in the case where the natural gas flow rate signal Ge is greater than the total fuel flow rate command signal Gd, the fuel oil flow rate control valve V2 becomes fully closed, whereby the inlet pressure of the fuel oil burner BN is maintained at the minimum value set by the minimum fuel oil pressure holding valve V3, and surplus steam generated by the boiler is dumped into a condenser (not shown) thereby to automatically control the steam pressure of the boiler at a constant value.

In each of the above described control systems, in order to burn safely and completely two kinds of fuels, namely, natural gas b and fuel oil c, in a boiler, it is necessary to control the flow rate of air d for combustion in accordance with the flow rates of the natural gas and the fuel oil. For this purpose, in general, a signal Gj, which is obtained by causing the sum signal Gi of the natural gas flow rate signal Ge and the fuel oil flow rate signal Gg to acquire a functional relationship set by an air flow rate command setter S2, is used as an air flow rate command signal, and the difference signal G1 of this air flow rate commmand signal Gj and an air flow rate signal Gk produced by an air flow rate detector TR4 installed at the inlet of the air d for combustion supplied to the burner is sent to an air flow rate controller C4. The corresponding output of this controller C4 is supplied to an actuator AT for adjustably varying the degree of opening of the vanes of an air blower AL, whereupon the actuator AT operates responsively to so adjust the degree of opening of the vanes that the combustion air flow rate signal Gk becomes equal to the above mentioned air flow rate command signal Gj.

In order to obtain a good combustion state in the boiler BL, in general, it is necessary to increase the air ratio (i.e., the ratio of quantities of the combustion air and the fuel) as the fuel flow rate decreases, this necessity being due to a characteristic of the burner BN. For this reason, the relationship between the flow rates of the fuel and the combustion air in the air flow rate command setter S2 shown in FIG. 2 is ordinarily caused to conform to the curve X shown by solid line or to the curve Y shown by single-dot chain line in FIG. 3.

The composition of the combustible component and the combustible component mixture ratio of the fuel oil c are already known and do not vary with time. For this reason, while the relationship between the flow rates of the fuel oil and the air required for combustion can be readily determined beforehand, and although the composition of the combustible component of natural gas, which contains methane gas and nitrogen as mentioned hereinbefore, is already known, the mixture ratio of the methane, which is the combustible component, is yet unknown and, moreover, varies with time. Consequently, the relationship between the natural gas flow rate (total flow rate of the methane and nitrogen) detected by the natural gas flow rate detector TR2 and the flow rate of the air required for combustion cannot be readily determined beforehand.

With air flow rate control depending on only the above mentioned air flow rate command signal Gj, if adjustment is so made as to obtain a good combustion state in the case of high mixture ratio of the combustible component in the natural gas, excessive air will be supplied in the case of low mixture ratio of the combustible component. Conversely, if adjustment is so made as to obtain a good combustion state in the case of low mixture ratio of the combustible component, the air quantity will be deficient in the case of high mixture ratio of the combustible component. Thus, a consistently good combustion state cannot be obtained no matter what the combustible component mixture ratio is.

With the aim of solving this problem, a method of controlling the concentration of the oxygen in the boiler exhaust gas e at a constant value by detecting the concentration (percentage) of the residual oxygen in the boiler exhaust gas e with an exhaust gas oxygen concentration detector TR5 as in the known system illustrated in FIGS. 1 and 2 has been proposed. In this method, detection signal Gm from the detector TR5 is compared with a signal Gn of a value set beforehand by an exhaust gas oxygen concentration setter S3, thereby to produce a difference signal Go, sending this difference signal Go to an exhaust gas oxygen concentration controller C5, and thus effecting control in a manner to reduce the flow rate of the air d when the concentration of oxygen in the exhaust gas e is high and to increase the air flow rate when the oxygen concentration in the exhaust gas is low.

Figure 3:
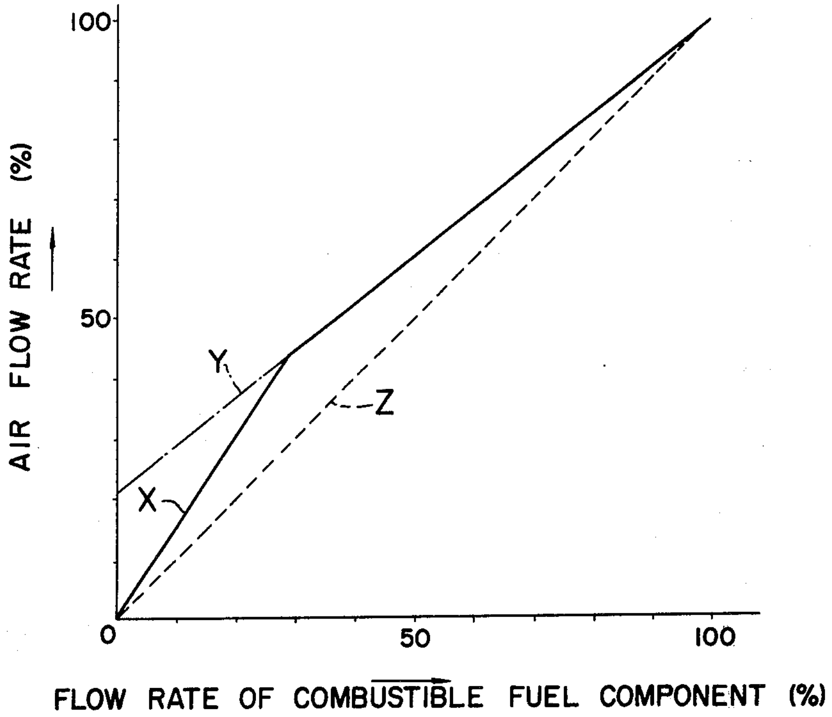
FIGS. 3 and 4 are graphs respectively indicating variations of air flow rate and concentration of residual oxygen in burner exhaust gas with flow rate of a combustible fuel component.

This control method will be examined under the assumption that, in the case of a methane content in the natural gas b of 100 percent, for example, and in the state where the output of the exhaust gas oxygen concentration controller C5 is zero percent, the set value of the air flow rate command setter S2 is representable by a straight line passing through the origin as indicated by the dotted line Z in FIG. 3, and the oxygen concentration in the exhaust gas is being so adjusted as to become a preset concentration. Then, in the case where only the natural gas flow rate is reduced to 50 percent from a state of a fuel oil flow rate of 10 percent, a natural gas flow rate of 90 percent, and a methane mixture ratio in the natural gas of 60 percent, it is seen that it is necessary to reduce the output of the exhaust gas oxygen concentration controller C5 from $90 \times (1 - 0.6) = 36$ percent to $50 (1 - 0.6) = 20$ percent in order to control the oxygen concentration in the exhaust gas to the preset concentration.

However, because of the relatively large detection time delay of the exhaust gas oxygen concentration detector TR5 and the integral time of the controller C5, the output of the controller C5 cannot decrease suddenly from 36 percent to 20 percent, and, in the worst case in the transition state from the reduction of the natural gas to the reduction of the output of the controller to 20 percent, the combustion assumes an air-deficient state wherein the air flow rate is $10 + 50 - 36 = 24$ percent relative to a combustible component total of the fuel of $10 + 50 \times 0.6 = 40$ percent. Conversely, when the natural gas flow rate increases from 50 percent to 90 percent, in the worst case in the transition state from the increase of the natural gas to the increase of the output of the controller C5 from 20 percent to 36 percent, the combustion assumes an excessive air state wherein the air flow rate is $10 + 90 - 20 = 80$ percent relative to a combustible component total of the fuel of $10 + 90 \times 0.6 = 64$ percent. Thus, an undesirable state of the air ratio disadvantageously arises in the transition state after a variation in the natural gas flow rate.

Figure 4:
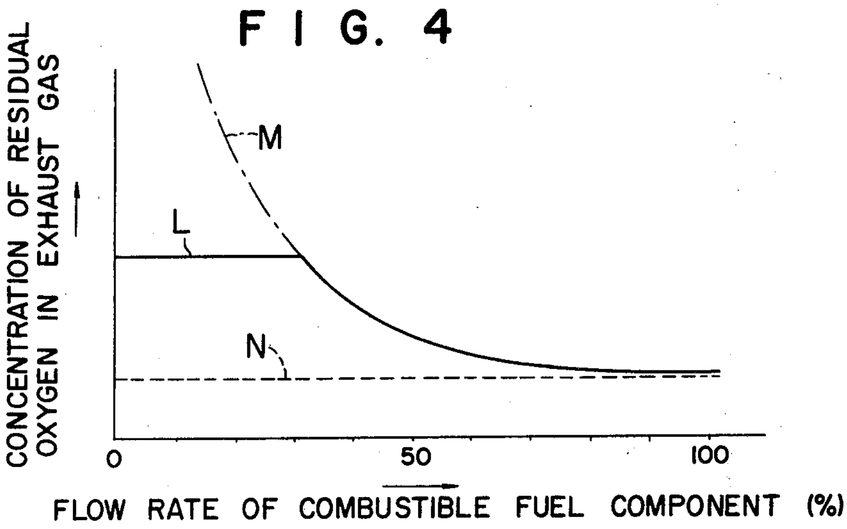

The control system illustrated in FIG. 2 is accompanied by another problem in that, unless the set value of the exhaust gas oxygen concentration setter S3 is automatically changed as indicated by the solid line L (corresponding to characteristic curve X in FIG. 3) or by the single-dot chain M (corresponding to characteristic curve Y in FIG. 3) in FIG. 4 in response to the boiler load, the relationship between the combustible component total of the fuel flow rate and the air flow rate in the normal state will become as indicated by the dotted straight line Z in FIG. 3 passing through the origin, and a satisfactory combustion state cannot be attained in the case where the total fuel flow rate is low, irrespective of whatever characteristic of the setter S2 is selected. In FIG. 4 the dotted line N corresponds to the characteristic line Z in FIG. 3.

Furthermore, in a control system which controls the natural gas flow rate by means of a steam pressure controller C1 as indicated in FIG. 2, the control operation comprises only controlling the total flow rate of methane gas and nitrogen gas in accordance with variation of the output Gd of the controller C1. For this reason, when the natural gas b consists of 100 percent methane, for example, the quantity of heat imparted to the boiler BL varies 50 percent as a result of a 50-percent variation in the output of the controller C1, but when the methane mixture ratio in the natural gas is 60 percent, the quantity of heat imparted to the boiler varies only 30 percent as a consequence of a 50-percent variation in the output of the controller C1. Thus, there is the problem of variation of the steam pressure control characteristic of the boiler depending on the combustible component mixture ratio in the natural gas.

Furthermore, the case of a system which controls the natural gas flow rate from the side of a pressure control device of the LNG tank, unrelatedly to the automatic combustion control device, will be considered. In this case, when the output Gd of the controller C1, that is, the boiler load is in a constant state and the natural gas flow rate varies 50 percent, the fuel oil flow rate varies 50 percent in the direction for compensating for the variation of the natural gas flow rate (i.e., the direction opposite to that of the variation of the natural gas flow rate). In the case where the natural gas is 100-percent methane, the total quantity of heat imparted to the boiler does not vary, whereby there is no problem.

However, in the case of 60 percent of methane in the natural gas, the variation of the quantity of heat imparted to the boiler due to a variation of the natural gas flow rate is 30 percent, while the quantity of heat imparted to the boiler by a variation in the fuel oil flow rate is compensated for by 50 percent. Accordingly, as the difference, a fluctuation of 20 percent in the quantity of heat imparted to the boiler arises, whereby the boiler steam pressure fluctuates. The degree of this fluctuation disadvantageously varies depending on the mixture ratio of the combustible component in the natural gas.

According to this invention, which contemplates overcoming the above described problems encountered in the known control systems, the flow rate signal of a first fuel (natural gas) of yet unknown combustible component mixture ratio, the flow rate signal of a second fuel (fuel oil) of already known combustible component mixture ratio, the flow rate signal of the air for combustion, and the concentration signal of the residual oxygen in the boiler exhaust gas, the above signals being all utilized for control in a known control system, are introduced as inputs into an operational circuit according to a combustion reaction equation. The combustible component mixture ratio of the first fuel of the yet unknown combustible component mixture ratio is thereby automatically determined and multiplied by the flow rate signal of the first fuel of yet unknown combustible component mixture ratio. The combustible component flow rate signal of the first fuel thus obtained is utilized for control of the above mentioned fuel flow rate and the combustion air flow rate.

As a result, for all values respectively of the flow rate ratio of the two fuels, flow rate variation of the first fuel, and the mixture ratio of the combustible component in the first fuel of yet unknown combustible component, automatic control of the air for combustion for continually good combustion is attained. At the same time, the boiler steam pressure control characteristic is prevented from varying at any combustible component mixture ratio of the first fuel of yet unknown combustible component ratio.

In order to indicate more fully the nature and utility of this invention, a preferred embodiment thereof will now be described.

Figure 5:
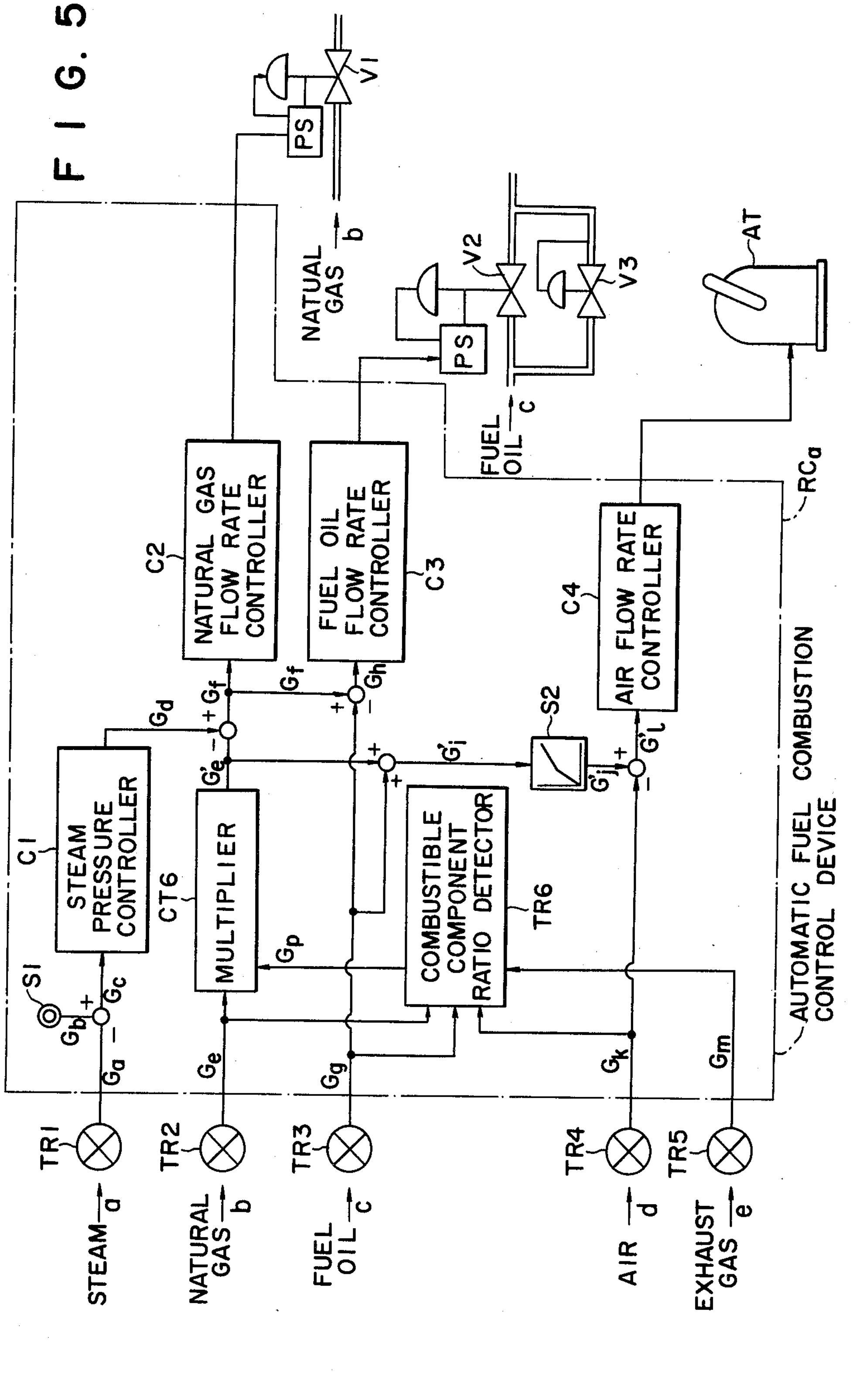
FIG. 5 is a circuit diagram showing the essential organization of one example of an automatic fuel combustion control device in the system according to this invention.

Referring to FIGS. 1 and 5, the pressure of the steam a generated in the boiler BL is detected by the steam pressure detector TR1, which thereupon responsively generates a pressure signal Ga. This pressure signal Ga is compared in an automatic fuel combustion control device RCa with a setting signal produced by a steam pressure setter S1. The resulting difference signal Gc is supplied to a steam pressure controller C1 thereby to vary the output thereof so that the steam pressure will become equal to a specific preset value. The resulting output of the steam pressure controller C1 becomes a total fuel flow rate command signal Gd similarly as in the aforedescribed known system.

A natural gas flow rate signal Ge generated by the natural gas flow rate detector TR2 is multiplied in a multiplier CT6 by a ratio signal Gp generated by a combustible component ratio detector TR6. The combustible component signal thus obtained, that is, a methane gas flow rate signal G'e is compared with the above mentioned total fuel flow rate command signal Gd, and the resulting difference signal Gf is sent to a natural gas flow rate controller C2, which thereby controls the flow rate of the natural gas b by means of the natural gas flow rate control valve V1 so that the methane gas flow rate signal G'e will become equal to the above mentioned command signal Gd.

In the case where, in spite of the fully opened state of the natural gas flow rate control valve V1, the flow rate of the methane gas in the natural gas b is less than the above mentioned required flow rate, the difference signal Gf representing the difference between the above mentioned command signal Gd and the output signal G'e of the multiplier CT6 is the fuel oil flow rate command signal; and the difference signal Gh representing the difference between this difference signal Gf and the fuel oil flow rate signal Gg produced as a detection signal by the fuel oil flow rate detector TR3 is applied to a fuel oil flow rate controller C3 thereby to control the fuel oil flow rate control valve V2 through the power circuit PS. Thus, deficient fuel is made up.

The output signal G'e of the multiplier CT6, moreover, is added to the fuel oil flow rate signal Gg, and the resulting addition signal G'i is sent to an air flow rate command setter S2, which thereby produces as output an air flow rate command signal G'j such that a good combustion state is continually obtained irrespective of the total fuel flow rate as a result of the curve X or the curve Y in FIG. 3. The difference signal G'l representing the difference between this output signal G'j and an air flow rate detection signal Gk produced by the air flow rate detector TR4 is applied to an air flow rate controller C4, which thereby so controls the vane actuator AT of the air fan AL that the combustion air flow rate signal Gk will become equal to the above mentioned air flow rate command signal G'j. Thus, the burner Bl can carry out good combustion.

If the mixture ratio of the combustible component of the natural gas b, that is, the flow rate of the methane gas, becomes known, the relationship between the methane gas flow rate and the air flow rate and the relationship between the fuel oil flow rate and the air flow rate are logically determined. For this reason, for all values of the mixture ratio of the natural gas b and the fuel oil c in burning the same, the mixture ratio of the nitrogen and the methane in the natural gas, and the flow rates of the natural gas and the fuel oil, good combustion can be automatically carried out.

Furthermore, since the methane gas flow rate and the fuel oil flow rate, which are the flow rates of the combustible components, are controlled by the output of the steam pressure controller C1, the total quantity of heat supplied to the boiler is promptly controlled so as to correspond to the output of the steam pressure controller C1 irrespective of the value of the mixture ratio of the combustible component in the natural gas b, irrespective of the method of controlling the flow rate of the natural gas with the steam pressure controller C1, and irrespective of whether the control is carried out unrelatedly to the automatic combustion control device. Thus, the steam pressure control characteristic does not vary.

Figure 6:
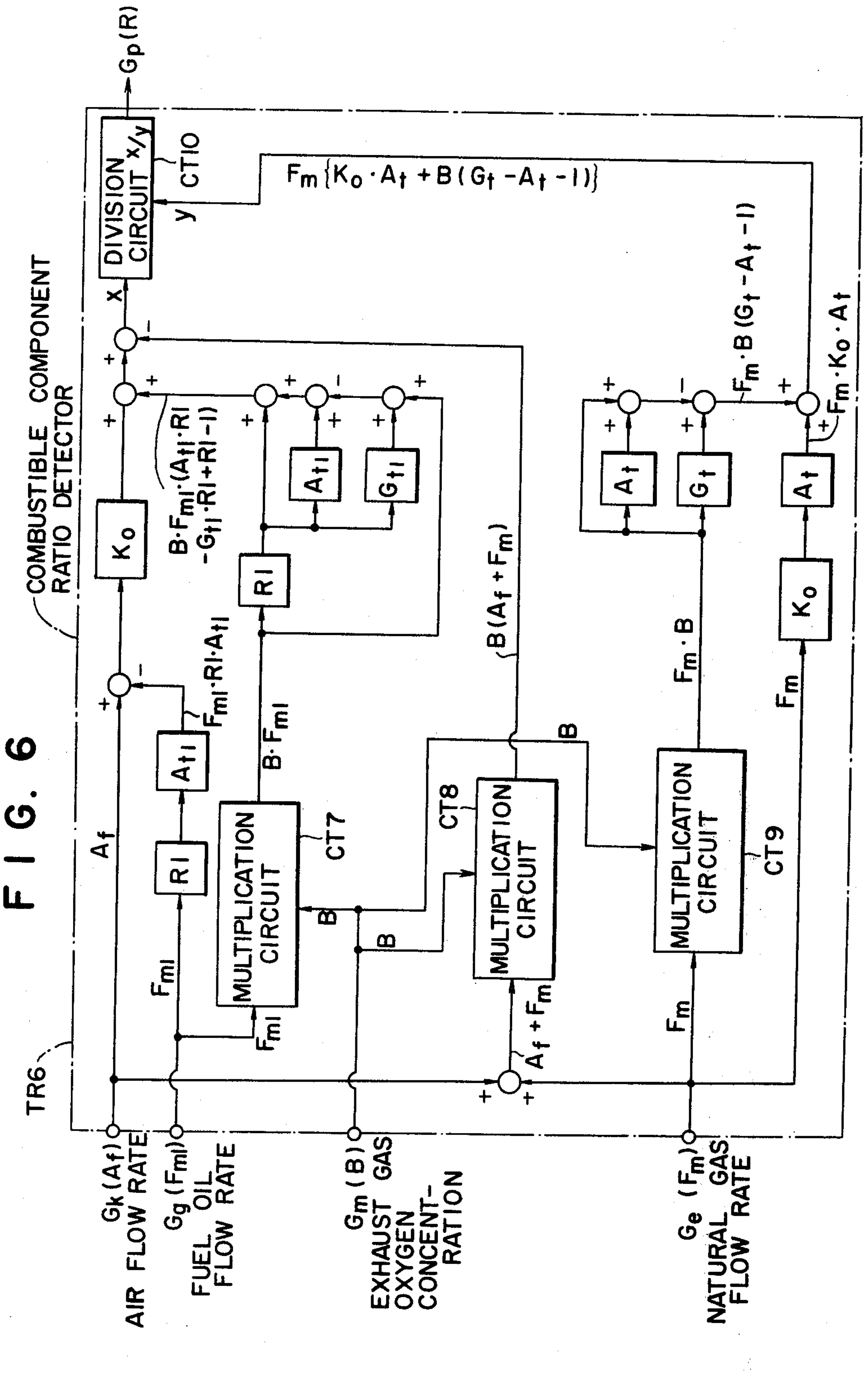
FIG. 6 is a schematic circuit diagram of a combustible component ratio detector in the form of an operational circuit in the control device illustrated in FIG. 5.

The combustible component ratio detector TR6 in the above described embodiment of this invention comprises an operational circuit as shown in FIG. 6, into which are supplied as input signals respectively of the natural gas flow rate Ge(Fm), the fuel oil flow rate Gg (Fm1), the air flow rate Gk(Af), and the exhaust gas oxygen concentration Gm (B). The organization and features of this combustible component ratio detector TR6 will now be described below.

For the following analysis, it will be assumed that the incombustible components of the natural gas and the fuel oil can exist as a gas in the exhaust gas e, and the following symbols will be used to designate respective quantities as follows:

Fm, the flow rate of a first fuel of 100 R% combustible component, e.g., the flow rate of natural gas b;

At, the unit theoretical air quantity for the combustion of said combustible component, e.g., methane gas;

Gt, the unit theoretical exhaust gas flow rate resulting from this combustion;

Fm1, the flow rate of a second fuel of another kind combusted at the same time, e.g., fuel oil;

100 R1 %, the quantity of the combustible component thereof;

At1, the unit theoretical air quantity for the combustion of this combustible component;

Gt1, the unit theoretical exhaust gas quantity resulting from this combustion;

Af, the quantity of the air supplied for the combustion of the above two fuels; and Ko, percentage proportion of oxygen in air.

Then, the percentage proportion B (%) of the residual oxygen in the exhaust gas resulting from the combustion of the above fuels is expressed by the following equation.

$$B = \frac{(Af - At \cdot R \cdot Fm - At1 \cdot R1 \cdot Fm1)Ko}{Af - At \cdot R \cdot Fm - At1 \cdot R1 \cdot Fm1 + Gt \cdot R \cdot Fm + (1 - R)Fm + Gt1 \cdot R1 \cdot Fm1 + (1 - R1) \cdot Fm1} \quad (1)$$

In this Eq.(1) :

(I) At·R·Fm + At1·R1·Fm1 is the flow rate of the air used for the combustion of the two fuels;

(II) Af − (At·R·Fm + At1·R1·Fm1) is the flow rate of air not participating in the combustion of the two fuels;

(III) Gt·R·Fm + Gt1·R1·Fm1 is the flow rate of the exhaust gas produced by the combustion of the two fuels;

(IV) (1−R) Fm + (1 − R1) Fm1 is the incombustible component exhausted as gas in the two fuels; and (V) Ko {Af − (At·R·Fm + At1·R1·Fm1)} is the quantity of oxygen in the exhaust gas.

Since the concentration B of the residual oxygen in the exhaust gas is given by the ratio of the quantity of oxygen (V) in the exhaust gas and the total quantity (II)+(III)+(IV) of the exhaust gas, Eq. (1) is valid.

When Eq.(1) is transformed for determination of the yet unknown mixture ratio R of the combustible component, the following equation is obtained.

$$R = \frac{Ko \cdot Af - B(Af + Fm) - Ko \cdot At1 \cdot R1 \cdot Fm1 + B \cdot Fm1\,(At1 \cdot R1 - Gt1 \cdot R1 + R1 - 1)}{Fm\,\{\,Ko \cdot At + B\,(Gt - At - 1)\,\}} \quad (2)$$

From this Eq. (2), the unknown mixture ratio R of the combustible component in the first fuel, i.e., the natural gas, can be determined.

This Eq.(2) can be represented as a block diagram as shown in FIG. 6. In this figure, CT7, CT8 and CT9 are multiplication circuits, while CT10 is a division circuit for dividing a signal x by a signal y. The other blocks are also multiplication circuits in each of which multiplication by the quantity represented by the symbol therein is made. It will be readily noted that multiplication of Fm1 by B is made in the circuit CT7, multiplication of B by Af+Fm in the circuit CT8, and multiplication of Fm by B in the circuit CT9. Details of the combustible component ratio detector TR6 are blieved to be apparent from the consideration of FIG. 6, from which it will be noted that the output signal Gp of the division circuit CT10 representsthe unknown mixture ratio R.

The case where the fuel comprises natural gas and fuel oil will be considered. In this case, in the above Eq.(2), At and Gt are of already known constant values determined by the characteristic of methane gas, At1, Gt1 and R1 are of already known constant values determined by the characteristic of fuel oil and Ko is of an already known constant value expressed as a percentage proportion of oxygen in the atmospheric air. Accordingly, these values can be preset in the operation circuit or setup diagram of FIG. 6.

Then, by detecting the flow rate signal Ge of the flow rate Fm of the natural gas, which is the fuel of yet unknown combustible component mixture ratio, the flow rate signal Gg of the flow rate Fm1 of the fuel oil, which is the fuel of already known combustible component mixture ratio, the flow rate signal Gk of the flow rate Af of the air for combustion, and the signal Gm of the concentration B of the residual oxygen in the exhaust gas and introducing these signals into the operational circuit of FIG. 6, the mixture ratio R of the combustible component of the fuel of yet unknown combustible component mixture ratio can be always be automatically determined as described above.

In the case where only the first fuel of yet unknown combustible component mixture ratio R is burned, the flow rate Fm1 is kept fixed at zero in FIG. 6.

Another possible method of achieving the objects of this invention is to provide separately detectors such as a gas analizer and a calorimeter for analizing the composition of the first fuel of yet unknown combustible component mixture ratio and to utilize the value resulting from the multiplication of the combustible component mixture ratio determined by means of these detectors by the flow rate signal of the first fuel of yet unknown combustible component mixture ratio for control of the fuel flow rate and control of the quantity of air for combustion. However, these instruments are generally expensive, and, moreover, suitable instruments of excellent reliability, response, and maintenance characteristic which are usable in an on-line manner in an automatic control system are extremely scarce.

In accordance with this invention, fuel flow rate detectors and an air flow rate detector generally used heretofore for automatic combustion control of boilers and a detector for detecting the concentration of the oxygen in the exhaust gas generally used heretofore supervision of boilers are used, and, by adding a relatively simple operational circuit to an automatic combustion control device, fuel of yet unknown combustible component mixture ratio can be completely combusted. Thus, the aforedescribed problems accompanying automatic combustion control devices of known type are overcome.

We claim:

1. In the automatic combustion of fuels each containing at least one combustible component, wherein the composition of each combustible component is known, but the combustible component mixture ratio of one fuel is yet unknown, a method of automatically controlling the combustion of the fuels which comprises: measuring the flow rate of each fuel, the flow rate of air for the combustion, and the percentage ratio of residual oxygen in the exhaust gas resulting from the combustion; introducing the values thus measured as inputs into a combustible component ratio detector comprising a circuit for carrying out an operation according to a reaction formula of the combustion thereby to automatically determine the combustible component mixture ratio of said one fuel of unknown combustible component mixture ratio; multiplying the combustible component mixture ratio thus determined by a signal of the flow rate of said one fuel; and utilizing the resulting value thus obtained by the multiplication for automatic control of the flow rates of said fuels and the flow rate of the air for the combustion.

2. In apparatus for automatic combustion of fuels each containing at least one combustible component, wherein the composition of each combustible component is known, but the combustible component mixture ratio of one fuel is yet unknown, an automatic combustion control system comprising: means for respectively measuring the flow rate of each fuel, the flow rate of air for the combustion, and the percentage ratio of residual oxygen in the exhaust gas resulting from the combustion and respectively generating signals respectively corresponding to results of the measurements; a combustible component ratio detector comprising a circuit for carrying out an operation according to a reaction formula of the combustion, said detector being supplied with said signals and thus operating to automatically determine the combustible component mixture ratio of said one fuel of unknown combustible component mixture ratio; multiplication means for multiplying the combustible component mixture ratio thus determined by the signal of the flow rate of said one fuel; and controlling means operating in response to the value resulting from the multiplication to automatically control the flow rate of each fuel and the flow rate of the air for combustion.

3. The system for automatically controlling the combustion as claimed in claim 2, in which said reaction formula is $$R = \frac{Ko \cdot Af - B(Af + Fm) - Ko \cdot Atl \cdot Rl \cdot Fml + B \cdot Fml\,(Atl \cdot Rl - Gtl \cdot Rl + Rl - 1)}{Fm\,\{Ko \cdot At + B\,(Gt - At - 1)\}}$$

where:

R is the combustible component mixture ratio;
Ko is the proportion (%) of oxygen in air;
Fm is the flow rate of said one fuel;
At is the unit theoretical quantity of air for combustion of the combustible component of said one fuel;
Gt is the unit theoretical flow rate of the exhaust gas of said combustion of said one fuel;
Fm1 is the flow rate of a second fuel burned simultaneously with the one fuel;
R1 is the combustible component mixture ratio in the second fuel;
At1 is the unit theoretical quantity of air for combustion of said combustible component of mixture ratio R1;
Gt1 is the unit theoretical quantity of exhaust gas of said combustion of the second fuel;
Af is the quantity of air supplied for the combustion of the above named two fuels; and
B is the percentage of residual oxygen in the exhaust gas resulting from the combustion of the two fuels.

* * * * *